US012578145B2

(12) United States Patent
Saltzman et al.

(10) Patent No.: US 12,578,145 B2
(45) Date of Patent: Mar. 17, 2026

(54) HEAT EXCHANGER CORE GEOMETRIES USED AS SUPPORT MATERIAL AND FLUID CONNECTIVITY PASSAGES FOR HEAT EXCHANGER HEADERING

(71) Applicant: Hamilton Sundstrand Corporation, Charlotte, NC (US)

(72) Inventors: David Saltzman, Glastonbury, CT (US); Grum T. Ngatu, South Windsor, CT (US); Stephen Patrick Adamakis, Westwood, MA (US); Patrick McCord, Norwich, CT (US); Zachary Valente, Ellington, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 344 days.

(21) Appl. No.: 18/236,614

(22) Filed: Aug. 22, 2023

(65) Prior Publication Data

US 2025/0067514 A1     Feb. 27, 2025

(51) Int. Cl.
| | |
|---|---|
| F28D 1/053 | (2006.01) |
| F28F 1/00 | (2006.01) |
| B33Y 80/00 | (2015.01) |
| F28D 1/02 | (2006.01) |

(52) U.S. Cl.
CPC .......... F28D 1/05316 (2013.01); F28F 1/006 (2013.01); *B33Y 80/00* (2014.12); *F28D 2001/0266* (2013.01)

(58) Field of Classification Search
CPC .......... F28D 1/05316; F28D 2001/0266; F28F 1/006; F28F 7/02; F28F 9/0263; F28F 9/027; F28F 9/0273; F28F 9/0282; F28F 9/182; F28F 2225/06
See application file for complete search history.

(56) References Cited

U.S. PATENT DOCUMENTS

| | | | | |
|---|---|---|---|---|
| 1,847,743 A | * | 3/1932 | Gustave ................... | F28F 9/262 165/174 |
| 4,936,379 A | * | 6/1990 | Hoshino ................. | F28F 9/182 165/110 |
| 5,540,278 A | * | 7/1996 | Chiba .................... | F28F 9/0282 165/173 |
| 5,579,834 A | * | 12/1996 | Chiba ..................... | F28F 9/182 165/DIG. 476 |
| 10,583,535 B2 | | 3/2020 | Caimano et al. | |
| 10,809,007 B2 | | 10/2020 | Martinez et al. | |

(Continued)

FOREIGN PATENT DOCUMENTS

GB          844466 A  *  8/1960  .............. F28F 9/165

OTHER PUBLICATIONS

Extended European Search Report for EP Application No. 24195052. 6, dated Jan. 2, 2025, 8 pages.

*Primary Examiner* — Eric S Ruppert
*Assistant Examiner* — Hans R Weiland
(74) *Attorney, Agent, or Firm* — Kinney & Lange, P.A.

(57) ABSTRACT

A fluid circuit of a heat exchanger includes a core and a first header. The core is configured to receive a fluid and includes a plurality of conduits. Each of the plurality of conduits extends along a longitudinal axis from a first end portion to a second end portion. The first header is integrally formed with and fluidly connecting the plurality of conduits. Outer walls of the plurality of conduits taper outward relative to the longitudinal axes to join the first header.

16 Claims, 4 Drawing Sheets

(56)         References Cited

U.S. PATENT DOCUMENTS

| 11,397,062 | B2 | 7/2022 | Clavette et al. | |
| 2017/0205145 | A1* | 7/2017 | Manteiga | F28F 9/26 |
| 2018/0345425 | A1* | 12/2018 | Caimano | B23P 15/26 |
| 2020/0189046 | A1* | 6/2020 | Ravindranath | F28F 1/26 |
| 2021/0148638 | A1* | 5/2021 | Disori | F28F 9/013 |

* cited by examiner

HEAT EXCHANGER CORE GEOMETRIES USED AS SUPPORT MATERIAL AND FLUID CONNECTIVITY PASSAGES FOR HEAT EXCHANGER HEADERING

BACKGROUND

The present disclosure is directed generally to heat exchangers and more particularly to wall structure for additively manufactured heat exchangers.

Heat exchangers are most efficient when their core length is maximized since the majority of heat transfer occurs in this region. Consequently, if header sections of a heat exchanger can be reduced in size while maintaining the overall footprint of the heat exchanger, the heat exchanger can have improved performance. Multipass heat exchangers are used to increase thermal length of the heat exchanger while maintaining a compact footprint. Multipass heat exchangers, for example, require turnaround tanks or headers to redirect flow from a first pass to a second pass. Turnaround headers are traditionally manufactured as separate components and welded or assembled onto a heat exchange core. Post processing steps such as machining, welding, and inspection are typically required when additional components are needed to complete an assembly. Weld joints and additional supporting and/or joining structures often increase the footprint of the heat exchanger and/or reduce the effective size or length of the core.

SUMMARY

In one embodiment, this disclosure presents a fluid circuit of a heat exchanger. This fluid circuit includes a core and a first header. The core is configured to receive a fluid and includes a plurality of conduits. Each of the plurality of conduits extends along a longitudinal axis from a first end portion to a second end portion. The first header is integrally formed with and fluidly connecting the plurality of conduits. Outer walls of the plurality of conduits taper outward relative to the longitudinal axes to join the first header.

The present summary is provided only by way of example, and not limitation. Other aspects of the present disclosure will be appreciated in view of the entirety of the present disclosure, including the entire text, claims and accompanying figures.

Figure 1:
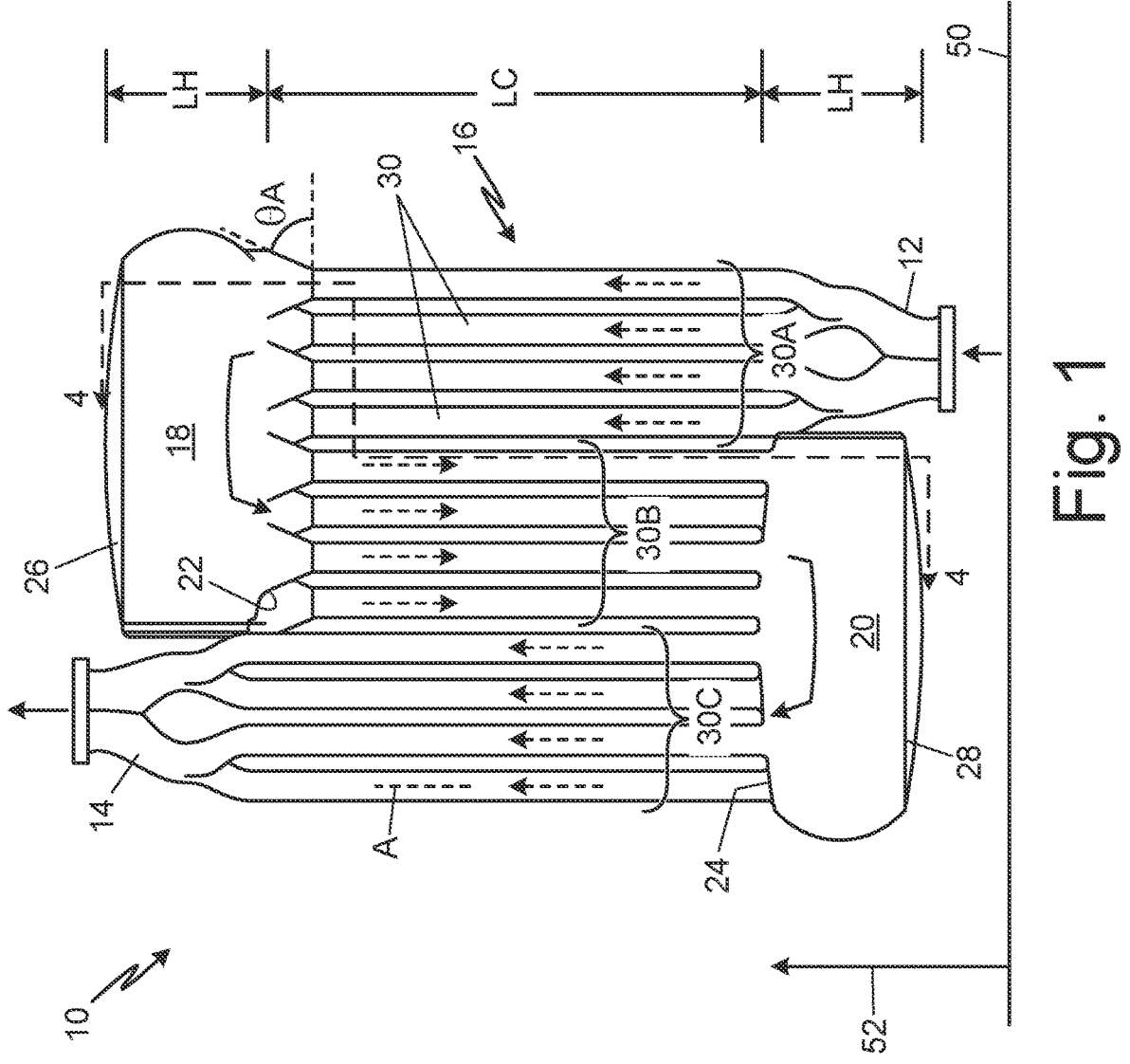
FIG. 1 is a front view of a multipass heat exchanger fluid circuit.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

The present disclosure is directed to a heat exchanger geometry that includes integrally formed headers or turnaround tanks. As disclosed herein, a self-supporting turnaround tank or header can be integrally formed with a heat exchange core via additively manufacturing using heat exchanger core passages as support material in the header. The disclosed heat exchanger can provide efficient heat exchange in a smaller footprint than traditional heat exchangers formed by assembling separate core and header components. Furthermore, the disclosed method of manufacture can reduce or eliminate post processing steps such as machining, welding, and inspection required with traditional manufacturing methods.

Figure 2:
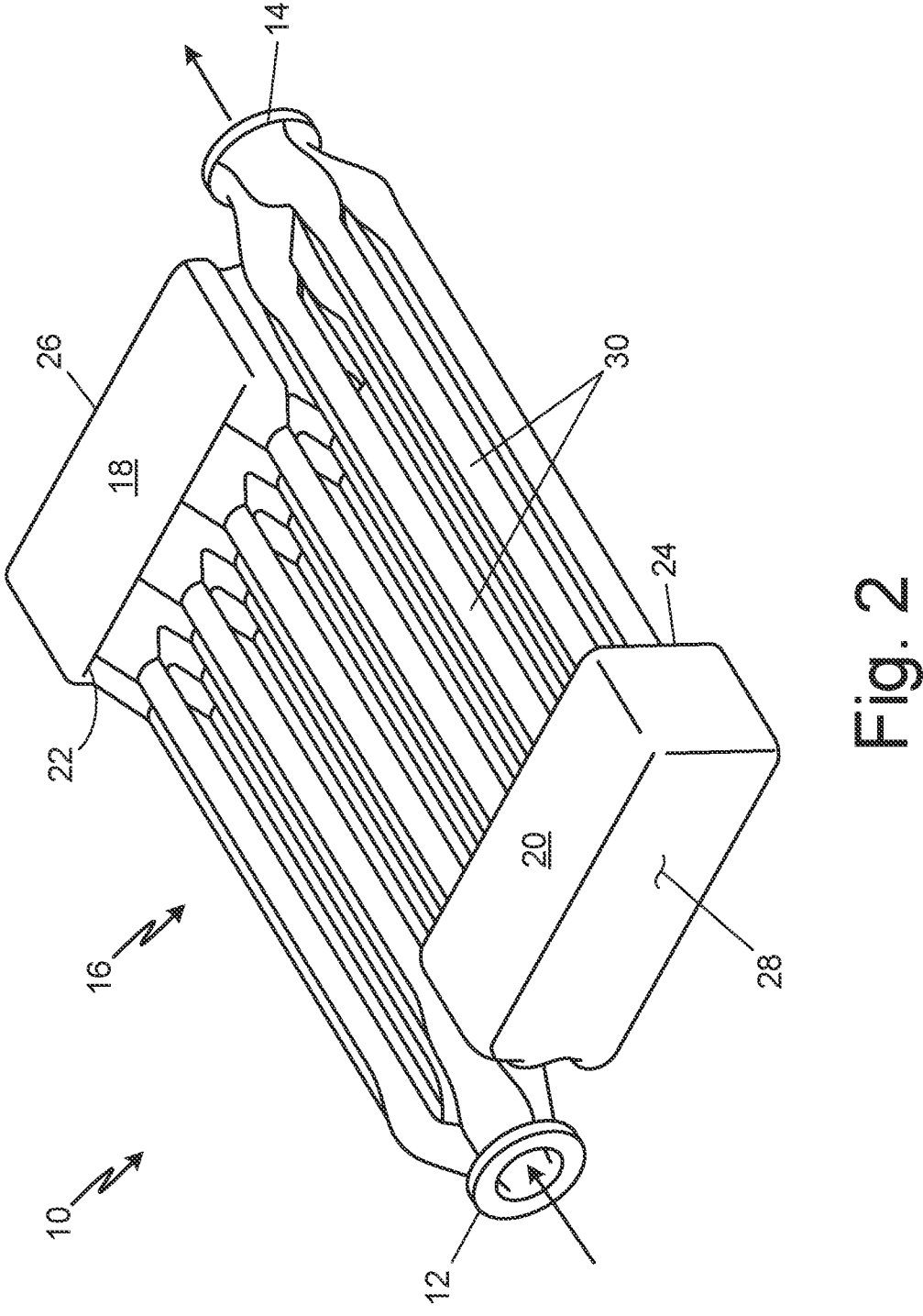
FIG. 2 is an isometric view of the multipass heat exchanger fluid circuit of FIG. 1.
Figures 3, 4:
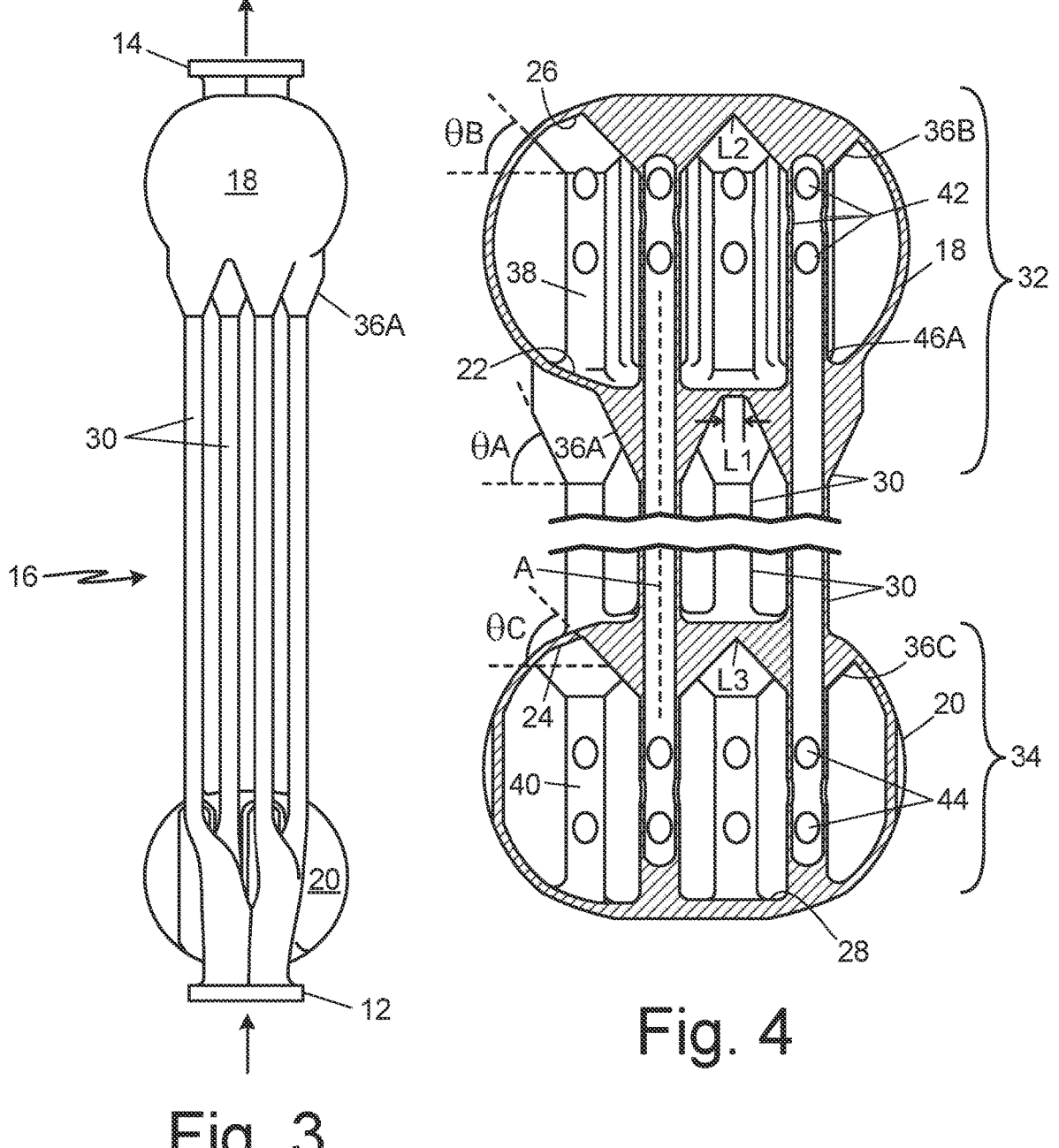
FIG. 3 is side view of the multipass heat exchanger fluid circuit of FIG. 1.
FIG. 4 is a broken cross-sectional view of the multipass heat exchanger fluid circuit taken along the 4-4 line of FIG. 1.
Figure 5:
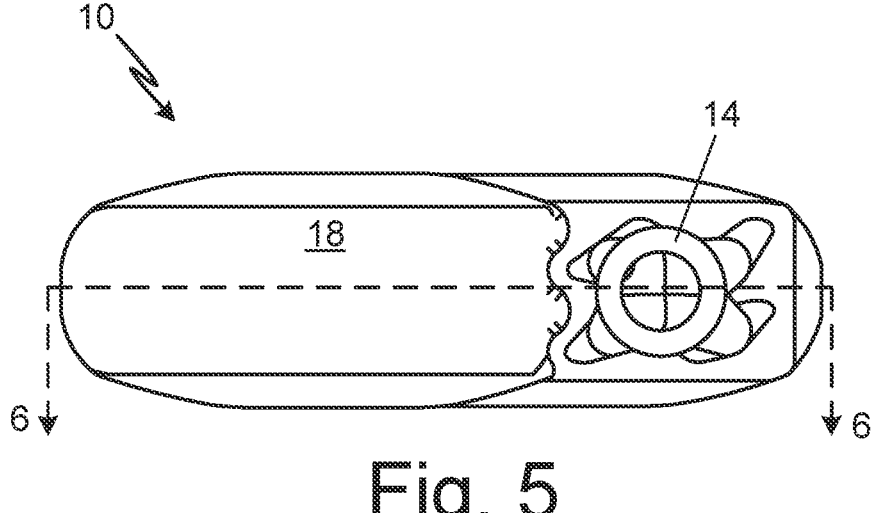
FIG. 5 is a top view of the multipass heat exchanger fluid circuit of FIG. 1.
Figure 6:
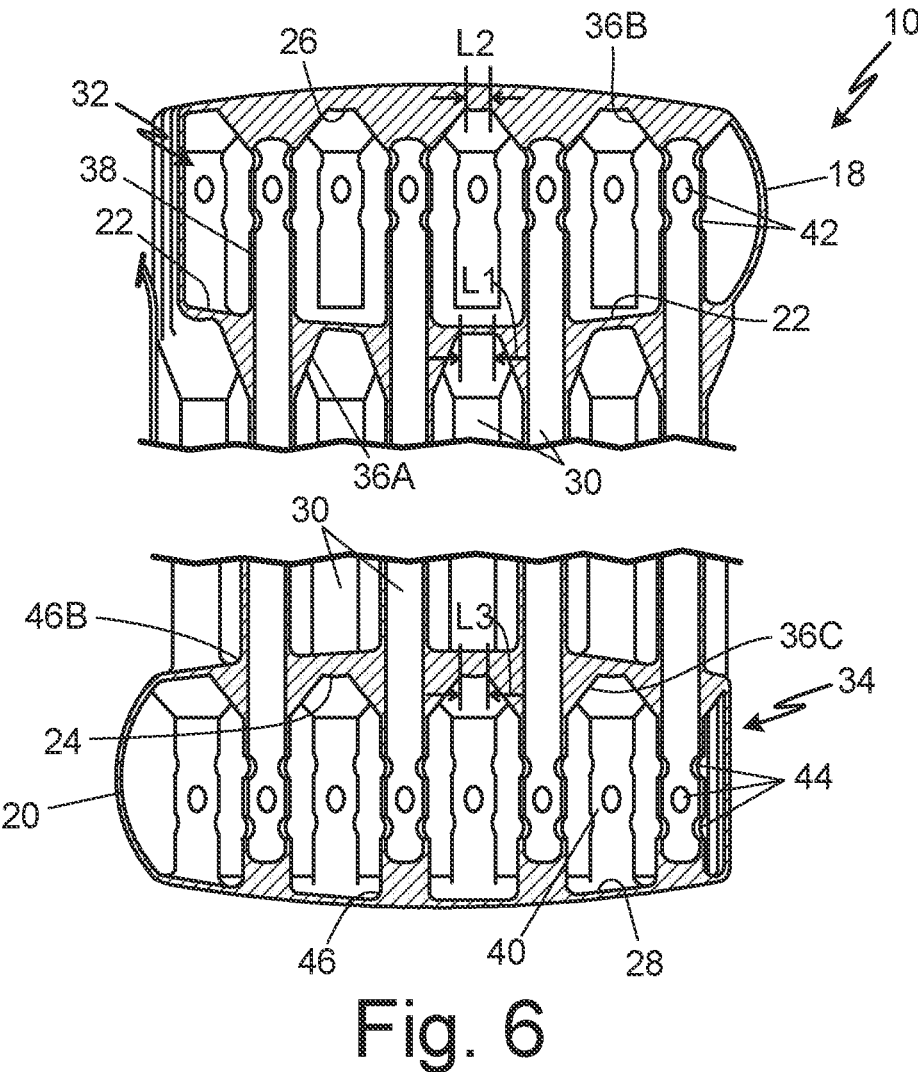
FIG. 6 is a cross-sectional view of the multipass heat exchanger fluid circuit taken along the 6-6 line of FIG. 5.

FIG. 1 is front view of a multipass heat exchanger fluid circuit. FIG. 2 is an isometric view of the multipass heat exchanger fluid circuit of FIG. 1. FIG. 3 is side view of the multipass heat exchanger fluid circuit of FIG. 1. FIG. 4 is a cross-sectional view of the multipass heat exchanger fluid circuit taken along the 4-4 line of FIG. 1. FIG. 5 is a top view of the multipass heat exchanger fluid circuit of FIG. 1. FIG. 6 is a cross-sectional view of the multipass heat exchanger fluid circuit taken along the 6-6 line of FIG. 5. FIGS. 1-6 are discussed together herein.

Fluid circuit 10, inlet 12, outlet 14, core 16, first header 18, second header 20, inner walls 22 and 24, outer walls 26 and 28, conduits 30 (including first pass conduits 30A, second pass conduits 30B, and third pass conduits 30C), first end portions 32, second end portions 34, tapered portions 36A, 36B, and 46A, narrowed portions 38 and 40, apertures 42, 44, fillets 46A, 46B, and 46C, build platform 50, build direction 52, build angles θA, θB, and θC, lengths L1, L3 of inner walls 22 and 24, length L2 of outer wall 26, lengths LH of first and second headers 18 and 20, and length LC of core 16 are shown. Fluid flow through inlet 12, outlet 14, core 16, and first and second headers 18 and 20 is shown by arrows. Dashed arrows indicate flow through conduits 30. Solid arrows indicate flow in first and second headers 18 and 20.

Fluid circuit 10 forms a portion of a multipass heat exchanger in which a first fluid received in conduits 30 is made to flow multiple times through a second fluid that flows between conduits 30 in core 16 before exiting. Thermal energy is transferred between the first fluid and the second fluid in each pass. Fluid circuit 10 can be, for example, a fluid circuit in a shell and tube type heat exchanger in which a body surrounds fluid circuit 10 to define a second fluid circuit.

Fluid circuit 10 includes inlet 12, outlet 14, core 16, first header 18, and second header 20. Inlet 12 is configured to receive a fluid and outlet 14 is configured to discharge the fluid from fluid circuit 10. Core 16 is disposed in fluid communication with inlet 12 and outlet 14. Core 16 receives fluid from inlet 12 and discharges fluid to outlet 14. Core 16 includes a plurality of conduits 30 configured to conduct the fluid, for example, between inlet 12 and first header 18, between first and second headers 18 and 20, and between second header 20 and outlet 14.

As illustrated in FIG. 1, the plurality of conduits 30 can be arranged in first, second, and third passes. Each pass can include a subset of the total conduits 30. First pass conduits

3

30A are arranged to transfer the fluid from inlet 12 to first header 18. Second pass conduits 30B are arranged to transfer the fluid from first header 18 to second header 20. Third pass conduits 30C are arranged to transfer the fluid from second header 20 to outlet 14. First and second headers 18 and 20 are turnaround tanks. First header 18 is configured to direct fluid received from first pass conduits 30A to second pass conduits 30B. Second header 20 is configured to direct fluid received from second pass conduits 30B to third pass conduits 30C.

In alternative embodiments, fluid circuit 10 can include less than three passes or more than three passes. Inlet 12 and outlet 14 can be located on the same end of conduits 30 or can be located on opposite ends of conduits 30 depending on the number of passes provided in fluid circuit 10. Two-pass heat exchangers include a single header. Multipass heat exchangers having more than three passes include three or more headers for redirecting fluid flow.

Conduits 30 extend in a lengthwise direction indicated by core length LC and header lengths LH. Each conduit 30 extends along a longitudinal axis A (shown in FIGS. 1 and 4) disposed perpendicular to build plate 50. Conduits 30 are arranged parallel to each other.

First and second headers 18 and 20 include inner walls 22 and 24, respectively, Inner walls 22 and 24 are innermost walls of first and second headers 18 and 20 relative to the longitudinal axes of conduits 30. First and second headers 18 and 20 include outer walls 26 and 28, respectively. Outer walls 26 and 28 form outermost walls of first and second headers 18 and 20 relative to the longitudinal axes of conduits 30. Inner walls 22 and 24 are integrally formed with outer walls 26 and 28, respectively, and with conduits 30.

First pass conduits 30A can be joined at inlet 12. Third pass conduits 30C can be joined at outlet 14. Inlet 12 and outlet 14 can have a branching configuration, in which a fluid flow is divided among a plurality of first pass conduits 30A and third pass conduits 30C, respectively.

First and second pass conduits 30A and 30B extend fully to outer wall 26 of first header 18. Second and third pass conduits 30B and 30C extend fully to outer wall 28 of second header 20. As shown in FIGS. 4 and 6, first and second pass conduits 30A and 30B are joined to inner wall 22 outside of first header 18 by tapered portions 36A. First and second pass conduits 30A and 30B are joined to outer wall 26 inside first header 18 by tapered portions 36B. First and second pass conduits 30A and 30B can be joined to inner wall 22 inside first header 18 by fillet 46A as shown in FIG. 4. Second and third pass conduits 30B and 30C can be joined to inner wall 24 outside of second header 20 by fillet 46B. Second and third pass conduits 30B and 30C are joined to inner wall 24 inside second header 20 by tapered portions 36C. Second and third pass conduits 30B and 30C can be joined to outer wall 28 inside second header 20 by fillets 46C.

Joining portions of conduits 30 are referred to herein as end portions. First pass conduits 30A include first end portions 32. Second pass conduits 30B include first end portions 32 and oppositely disposed second end portions 34. Third pass conduits include second end portions 34. As further described herein, first end portions 32 and second end portions 34 support the integral formation of first and second headers 18 and 20, respectively, during a build process. First header 18 is integrally formed with a fluidly connecting first end portions 32 of first and second pass conduits 30A and 30B. First end portions 32 of first and second pass conduits 30A and 30B extend into first header

4

18. First and second pass conduits 30A and 30B are open to first header 18. First end portions 32 of first and second pass conduits 30A and 30B include a plurality of apertures 42 to transfer the fluid to and from first header 18. Second header 20 is integrally formed with and fluidly connecting second end portions 34 of second and third pass conduits 30B and 30C. Second end portions 34 of second and third pass conduits 30B and 30C extend into second header 20. Second and third pass conduits 30B and 30C are open to second header 20. Second end portions 34 of second and third pass conduits 30B and 30C include a plurality of apertures 44 to transfer fluid to and from second header 20.

Conduits 30 can include tubes of cylindrical shape as illustrated. In alternative embodiments, conduits 30 can have other shapes designed to optimize thermal energy transfer and/or fluid dynamics. For example, fluid circuit 10 can include conduits of rectangular shape. In alternative embodiments, conduits 30 may have a corrugated shape.

Conduits 30 can be arranged in multiple rows as illustrated in FIGS. 2, 3, 4 and 6. Conduits 30 in one row can be offset relative to conduits 30 in an adjacent row to form a convoluted flow path for the second fluid circuit of the heat exchanger. Each pass includes a plurality of conduits 30 (i.e., first pass conduits 30A, second pass conduits 30B, and third pass conduits 30C). The number of conduits 30 in each pass and/or in each row and the number of rows of conduits 30 is not limited to the embodiment shown. It will be understood by one of ordinary skill in the art that the number, shape, and arrangement of conduits 30 can vary based on the heat exchanger application.

First end portions 32 of first and second pass conduits 30A and 30B include tapered portions 36A and 36B. In some embodiments, first end portions 32 can additionally include tapered portions in place of fillet 46A. Conduit walls in first end portions 32 taper outward from first and second pass conduits 30A and 30B in tapered portions 36A to join core 16 to first header 18. Conduit walls in tapered portions 36A are angled relative to first and second pass conduits 30A and 30B (i.e., portion of conduits 30 extending between first end portions 32 and second end portions 34). As described further herein, tapered portions 36A extend at a build angle θA relative to build platform 50. A minimum build angle θA can be determined by the capability of the additive manufacturing process. Build angle θA can be, for example, equal to or greater than 45 degrees. Build angle θA can be selected to reduce length L1 of inner wall 22 such that inner wall 22 is supported by tapered portions 36A during the build process and such that inner wall 22 does not require additional supports as described further herein.

Conduit walls in first end portions 32 taper outward to join inner wall 22 outside of first header 18 (within core 16). Inner wall 22 is disposed substantially perpendicular to conduits 30. Inner wall 22 can have a curved shape. Inner wall 22 separates core 16 from first header 18. Tapered portions 36A are disposed in core 16 and thereby in thermal communication with the second fluid provided to fluid circuit 10. Tapered portions 36A extend fully around conduits 30. For cylindrical conduits, tapered portions 36A can have a frustoconical shape. The shape of tapered portions 36A can vary in alternative embodiments depending on the shape of conduits 30.

Flow passages through conduits 30 can retain a cylindrical (or other) shape through tapered portions 36A, such that conduit walls are thickened in tapered portions 36A as shown in FIGS. 4 and 6.

First and second pass conduits 30A and 30B can be arranged and tapered portions 36A can be designed to minimize length L1 of inner wall 22. Length L1 is distance measured between adjacent tapered portions 36A. Length L1 can be substantially uniform around each tapered portion 36A or can vary. As described further herein, length L1 can be up to a maximum length allowed by an additive manufacturing process without supporting material.

A thickness of inner wall 22 can be selected to provide structural integrity of first header 18 while minimizing a contribution to the overall weight of fluid circuit 10.

First end portions 32 include narrowed portions 38. Narrowed portions 38 are segments of or extensions of conduits first and second pass conduits 30A and 30B disposed in core 16. Narrowed portions 38 can have a shape substantially the same as the shape of first and second pass conduits 30A and 30B in core 16. In some embodiments, narrowed portions 38 can extend from inner wall 22 toward outer wall 26 of first header 18. Narrowed portions 38 can be joined to inner wall 22 by fillets 46A. In other embodiments, tapered portions can extend from inner wall 22 to narrowed portions 38.

Narrowed portions 38 include apertures 42. Each narrowed portion 38 can include a plurality of apertures 42. Apertures 42 in first pass conduits 30A can provide substantially radial discharge of the fluid from first pass conduits 30A in first header 18. Apertures 42 in second pass conduits 30B are configured to receive fluid from first header 18. Apertures 42 in second pass conduits 30B can be substantially the same as apertures 42 in first pass conduits 30A. Apertures 42 can be offset along a length of narrowed portions 38 and/or apertures 42 can be offset about a circumference or perimeter of narrowed portions 38. Each narrowed portion 38 can include, for example, six apertures as shown in FIG. 4. In alternative embodiments, more than six or fewer than six apertures can be provided in each narrowed portion 38. Apertures 42 can have any shape. The shape of apertures 42 is not limited to the oval shape shown in FIGS. 4 and 6. The number, size, location, and/or shape of apertures 42 can be selected to reduce pressure loss in transfer of the fluid from first pass conduits 30A to first header 18.

Tapered portions 36B extend from narrowed portions 38 to outer wall 26 of first header 18 within first header 18. Walls of tapered portions 36B taper outward from narrowed portions 38 to outer wall 26 of first header 18. As described further herein, tapered portions 36B extend at build angle $\theta B$. A minimum build angle $\theta B$ can be determined by the capability of the additive manufacturing process. Build angle $\theta B$ can be, for example, equal to or greater than 45 degrees. Build angle $\theta B$ can be minimized to reduce length LH of first header 18 and maximize length LC of core 16 for a given footprint. As shown in FIG. 2, build angle $\theta B$ of tapered portions 36B can be less than build angle $\theta A$ of tapered portions 36A to reduce the length LH of header 18. Tapered portions 36B can be substantially solid as shown, for example, in FIGS. 4 and 6 or can include a flow passage or portion of a flow passages substantially matching a cylindrical (or other) shape of the flow passage through narrowed portions 38.

For cylindrical conduits, tapered portions 36B can have a frustoconical shape. The shape of tapered portions 36B can vary in alternative embodiments depending on the shape of conduits 30.

Tapered portions 36B can be designed to minimize length L2 of outer wall 26, shown in FIGS. 4 and 6. Length L2 is distance measured between adjacent tapered portions 36B. Length L2 can be substantially uniform around each tapered portion 36B or can be non-uniform as shown by comparing FIGS. 4 and 6, depending, for example, on the arrangement of conduits 30. As shown in FIG. 4, tapered portions 36B of adjacent conduits 30 arranged front-to-back can meet at an angle such that L2 is equal to approximately zero. As shown in FIG. 6, tapered portions 36B of adjacent conduits 30 arranged side-to-side can meet at outer wall 26 having a length L2 greater than zero. As described further herein, length L2 can be up to a maximum length allowed by an additive manufacturing process. Length L2 can be equal to length L1 of inner wall 22. L2 can vary depending on build angle $\theta B$ of tapered portions 36B.

A thickness of outer wall 26 can be selected to provide structural integrity of first header 18 while minimizing a contribution to the overall weight of fluid circuit 10. Outer wall 26 and inner wall 22 are integrally formed. As such, no welding joints or fastening mechanisms are needed to secure outer wall 26 to inner wall 22 or to secure first header 18 to core 16. Together outer wall 26 and inner wall 22 can have a domed or rounded shape, curving in extension to envelop end portions 32. As further described herein, outer wall 26 and inner wall 22 are integrally formed as a unitary structure with first end portions 32.

Second end portions 34 of second and third pass conduits include fillets 46C, narrowed portions 40, and tapered portions 36C. Second and third pass conduits 30B and 30C can join inner wall 24 of second header 20 outside of second header 20 via fillet 46B. Second end portions 34, including tapered portions 36C, narrowed portions 40, fillet 46C, and apertures 44, are fully disposed in second header 20. Conduit walls in second end portions 34 can be joined to outer wall 28 of second header 20 by fillet 46C. Narrowed portions 40 extend from outer wall 28 or fillet 46C toward inner wall 24. Tapered portions 36C connect narrowed portions 40 to inner wall 24. Walls of tapered portions 36C taper outward from narrowed portions 40 or inward from inner wall 24, such that walls of tapered portions 36C are angled relative to narrowed portions 40. As described further herein, tapered portions 36C extend at build angle $\theta C$. A minimum build angle $\theta C$ can be determined by the capability of the additive manufacturing process. Build angle $\theta C$ can be, for example, equal to or greater than 45 degrees. As previously with respect to tapered portions 36B in header 18, build angle $\theta C$ of tapered portions 36C can be minimized to reduce length LH of second header 20 and maximize a length of core 16 for a given footprint.

For cylindrical conduits, tapered portions 36C can have a frustoconical shape. The shape of tapered portions 36C can vary in alternative embodiments depending on the shape of conduits 30.

Flow passages through conduits 30B and 30C can retain a cylindrical (or other) shape through tapered portions 36C, such that conduit walls are thickened in tapered portions 36C as shown in FIGS. 4 and 6.

Conduits 30B and 30C can be arranged and tapered portions 36C can be designed to minimize length L3 of inner wall 24. Length L3 is distance measured between adjacent tapered portions 36C. Length L3 can be substantially uniform around each tapered portion 36C or can vary depending on the arrangement of conduits 30B and 30C. As described further herein, length L3 can be up to a maximum length allowed by an additive manufacturing process.

A thickness of inner wall 24 can be selected to provide structural integrity of second header 20 while minimizing a contribution to the overall weight of fluid circuit 10.

Narrowed portions 40 are segments or extensions of second and third pass conduits 30B and 30C and can have a shape substantially similar to the shape of second and third pass conduits 30B and 30C in core 16. Narrowed portions 40 include apertures 44. Each narrowed portion 40 can include a plurality of apertures 44. Apertures 44 in second pass conduits 30B can provide substantially radial discharge of the fluid from second pass conduits 30B in second header 20. Apertures 44 in third pass conduits 30C are configured to receive fluid from second header 20 and can be substantially the same as apertures 44 in second pass conduits 30B. Apertures 44 can be offset along a length of narrowed portions 40 and/or apertures 44 can be offset about a circumference or perimeter of narrowed portions 40. Each narrowed portion 40 can include, for example, six apertures as shown in FIG. 6. In alternative embodiments, more than six or fewer than six apertures can be provided in each narrowed portion 40A. Apertures 44 can have any shape. The shape of apertures 44 is not limited to the oval shape shown in FIGS. 4 and 6. The number, size, location, and/or shape of apertures 44 can be selected to reduce pressure loss in transfer of the fluid from second pass conduits 30B to second header 20. The number, shape, and size of apertures 44 can be substantially the same as the number, shape, and size of aperture 42.

A thickness of outer wall 28 can be selected to provide structural integrity of second header 20 while minimizing a contribution to the overall weight of fluid circuit 10. Together outer wall 28 and inner wall 24 can have a domed or rounded shape, curving in extension to envelop end portions 34. As such, no welding joints or fastening mechanisms are needed to secure outer wall 28 to inner wall 24 or to secure second header 20 to core 16. As further described herein, outer wall 28 and inner wall 24 are integrally formed as a unitary structure with second end portions 34.

Fluid circuit 10 can be formed using a powder bed fusion additive manufacturing process. Additive manufacturing processes include the ability to produce highly complex parts quickly and efficiently, and to modify design specifications of the desired part, for example by modifying CAD specifications, without re-tooling casting or machining equipment used for traditional, subtractive manufacturing processes.

Although the present figures depict a multipass heat exchanger, the tapered wall geometry presented herein can more broadly be applied to single pass heat exchangers with headers having internally connected fluid support features (i.e., fluid from multiple radial tubes can be collected in a common header). A single pass heat exchanger can include inlet and outlet plenum headers—one or both of which could have the disclosed tapered wall features.

FIG. 1 shows build platform 50 and build direction 52. Fluid circuit 10 is designed to allow first header 18 and second header 20 to be integrally formed with core 16. The integral formation of first header 18 and second header 20 can reduce an overall footprint of fluid circuit 10 and/or can elongate a heat exchange core 16 as compared to conventional heat exchangers that require weld joints and/or fasteners to assemble separate header inner and outer walls to the core. The lengths LH over which first header 18 and second header 20 extend from conduits 30 in core 16 can be reduced with integral formation of first and second headers 18 and 20. As such, a length LC of conduits 30 in core 16 can be increased to provide additional heat exchange capacity without increasing an overall length of fluid circuit 10 as compared to conventional single pass and multipass heat exchanger designs. First end portions 32 and second end portions 34 support inner and outer walls 22, 26 of first header 18 and support inner and outer walls 24, 28 of second header 20. A position of conduits 30 in first and second headers 18 and 20 remains fixed during operation of fluid circuit 10 and first and second headers 18 and 20 are sealed from a second fluid passing through core 16. No brazing, welding, or other fastening or sealing mechanisms are needed to secure conduits 30 in fluid communication with and in a sealed relationship with first and second headers 18 and 20.

As shown in FIG. 1, fluid circuit 10 is built from inlet 12 toward outlet 14. Outer wall 28 of second header 20 extends parallel to build platform 50. Outer wall 28 can be curved around second end portions 34 toward inner wall 24. Together outer wall 28 and inner wall 24 can have a domed or rounded shape, curving in extension to envelop end portions 34. Narrow portions 40 (shown in FIG. 4) can be formed directly on an inner surface of outer wall 28. Narrow portions 40 can be joined to outer wall 28 by fillet 46C. Narrowed portions 40 extend perpendicular to build platform 50. Tapered portions 36C are formed as an extension from narrowed portions 40. Tapered portions 36C are formed at build angle θC. A minimum build angle θC can be determined by the capability of the additive manufacturing process. Build angle θC can be, for example, equal to or greater than 45 degrees. A length of tapered portions 36C or build angle θC can be selected to minimize the length L3 of inner wall 24 between adjacent tapered portions 36C, such that inner wall 24 is supported by tapered portions 36C during the build process and such that inner wall 24 does not require additional supports, and to minimize length LH of second header 20.

Conduits 30 extend perpendicular to build platform 50. First pass conduits 30A are formed from inlet 12 toward first header 18. Second pass conduits 30B are formed from inner wall 24 toward first header 18. Third pass conduits 30C are formed from inner wall 24 toward outlet 14. First pass conduits 30A and second pass conduits 30B are joined to inner wall 22 outside of first header 18 by tapered portions 36A. Tapered portions 36A can be substantially the same as or similar to tapered portions 36C and can be formed in substantially the same or similar manner. A length of tapered portions 36A or build angle θA can be selected to minimize the length L1 of inner wall 22 between adjacent tapered portions 36A as previously described. Narrowed portions 38 (shown in FIG. 4) can be formed on inner wall 22 inside first header 18. Narrowed portions 38 can be joined to inner wall 22 by fillets 46A. Narrowed portions 38 extend perpendicular to build platform 50. Narrowed portions 38 are connected to outer wall 26 inside first header 18 by tapered portions 36B. Tapered portions 36B can be substantially the same as tapered portions 36C and formed in substantially the same manner. A length of tapered portions 36B or build angle θB can be selected to minimize the length L2 of outer wall 26 between adjacent tapered portions 36B and to minimize length LH of first header 18. Inner wall 22 can curve around end portions 32 to join outer wall 26. Together outer wall 26 and inner wall 22 can have a domed or rounded shape, curving in extension to envelop end portions 32.

Fluid circuit 10 can be formed of any thermally conductive material suitable for the desired heat exchanger application and suitable for use in a powder bed fusion additive manufacturing process. Powder bed additive manufacturing processes can include but are not limited to selective laser sintering, selective laser melting, electron beam melting, and direct metal laser sintering.

The disclosed fluid circuit for a multipass heat exchanger is designed to provide self-supporting headers allowing for integral formation with a fluid circuit core. The disclosed fluid circuit is designed to reduce and/or eliminate post-processing steps, including assembly and welding and to increase an effective heat transfer length of core conduits to improve heat exchange capacity over conventional fluid circuit designs.

The embodiments disclosed herein are intended to provide an explanation of the present invention and not a limitation of the invention. The disclosed self-supporting features (i.e., tapered portions 36A, 36B, 36C) and methods can be applied to the manufacture of single pass heat exchanger fluid circuits having an inlet and outlet header, two-pass heat exchanger fluid circuits having a single header consistent with either first header 18 or second header 20 and disposed opposite both an inlet and outlet, or multi-pass heat exchanger fluid circuits having three or more headers.

Discussion of Possible Embodiments

The following are non-exclusive descriptions of possible embodiments of the present invention.

A fluid circuit of a heat exchanger includes a core and a first header. The core is configured to receive a fluid and includes a plurality of conduits, each conduit of the plurality of conduits extending along a longitudinal axis from a first end portion to a second end portion. The first header is integrally formed with and fluidly connecting the plurality of conduits. Outer walls of the plurality of conduits taper outward relative to the longitudinal axes to join the first header.

The fluid circuit of the preceding paragraph can optionally include, additionally and/or alternatively, any one or more of the following features, configurations and/or additional components:

In an embodiment of the preceding fluid circuit, the first header can include an outermost wall and an innermost wall relative to the longitudinal axes of the plurality of conduits. The plurality of conduits can be joined to each of the outermost wall and the inner most wall. The outer walls in the first end portions of the plurality of conduits can taper outward to join at least one of the outermost wall and the innermost wall.

In an embodiment of any of the preceding fluid circuits, the outer walls in the first end portions of the plurality of conduits can taper outward to join the other of the outermost wall and the innermost wall.

In an embodiment of any of the preceding fluid circuits, the outer walls in the first end portions of the plurality of conduits can taper outward to join the innermost wall of the first header outside of the first header.

In an embodiment of any of the preceding fluid circuits, tapered portions of the outer walls of the first end portions can have a frustoconical shape.

In an embodiment of any of the preceding fluid circuits, each first end portion of the plurality of conduits can include an aperture disposed between the outermost wall and the innermost wall.

In an embodiment of any of the preceding fluid circuits, each first end portion of the plurality of conduits can include a plurality of apertures disposed between the outermost wall and the innermost wall.

In an embodiment of any of the preceding fluid circuits, apertures of the plurality of apertures can be offset axially.

In an embodiment of any of the preceding fluid circuits, apertures of the plurality of apertures can be disposed on different sides of the conduit.

In an embodiment of any of the preceding fluid circuits, the innermost wall can extend substantially perpendicular to the plurality of conduits.

In an embodiment of any of the preceding fluid circuits, the first end portions of the plurality of conduits can join the innermost wall inside the first header with a fillet.

In an embodiment of any of the preceding fluid circuits, the plurality of conduits is a plurality of first pass conduits and a plurality of second pass conduits and wherein the fluid circuit further include a plurality of third pass conduits extending parallel to the first pass conduits and the second pass conduits between first end portions and second end portions, and a second header integrally formed with and fluidly connecting the plurality of second pass conduits and third pass conduits. Outer walls of the pluralities of second pass conduits and third pass conduits can taper outward relative to the longitudinal axes to join the second header.

In an embodiment of any of the preceding fluid circuits, the second header can include an outermost wall and an innermost wall. The second and third pass conduits can be joined to each of the outermost wall and the inner most wall. Outer walls of the second end portions of the second and third pass conduits can taper outward to join at least one of the outermost wall and the innermost wall.

In an embodiment of any of the preceding fluid circuits, outer walls of the second end portions of the second and third pass conduits can taper outward between the outermost wall and the innermost wall to join the innermost wall.

In an embodiment of any of the preceding fluid circuits, outer walls of the second end portions of the second and third conduits can join the outermost wall with a fillet.

In an embodiment of any of the preceding fluid circuits, the outermost walls of the first and second headers can be integrally formed with the innermost walls of the first and second headers, respectively.

In an embodiment of any of the preceding fluid circuits, each second end portion of the second and third pass conduits can include an aperture disposed between the outermost wall and the innermost wall.

In an embodiment of any of the preceding fluid circuits, each second end portion of the second and third pass conduits can include a plurality of apertures disposed between the outermost wall and the innermost wall.

In an embodiment of any of the preceding fluid circuits, the second end portions of the first pass conduits can be fluidly connected to one of an inlet and an outlet and wherein the first end portions of the third pass conduits are fluidly connected to the other of the inlet and the outlet.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fluid circuit of a heat exchanger, the fluid circuit comprising:

a core configured to receive a fluid, the core comprising a plurality of conduits, each conduit of the plurality of conduits extending along a longitudinal axis from a first end portion to a second end portion; and a first header integrally formed with and fluidly connecting the plurality of conduits wherein the first header comprises an outermost wall and an innermost wall relative to the longitudinal axes of the plurality of conduits, wherein the plurality of conduits is joined to each of the outermost wall and the innermost wall;

wherein an outer wall of each conduit of the plurality of conduits comprises a first tapered section and a second tapered section, the first tapered section tapering outward relative to the longitudinal axis of the respective conduit to join a surface of the innermost wall outside of the first header, and the second tapered section tapering outward relative to the longitudinal axis of the respective conduit to join a surface of the outermost wall inside the first header.

2. The fluid circuit of claim 1, wherein tapered portions of the outer walls of the first end portions have a frustoconical shape.

3. The fluid circuit of claim 1, wherein each first end portion of the plurality of conduits comprises an aperture, the aperture disposed between the outermost wall and the innermost wall.

4. The fluid circuit of claim 1, wherein each first end portion of the plurality of conduits comprises a plurality of apertures, the plurality of apertures disposed inside the first header between the innermost wall and the second tapered section.

5. The fluid circuit of claim 4, wherein apertures of the plurality of apertures are axially spaced along the respective longitudinal axis.

6. The fluid circuit of claim 4, wherein apertures of the plurality of apertures are disposed on different sides of the conduit.

7. The fluid circuit of claim 3, wherein the innermost wall extends substantially perpendicular to the plurality of conduits.

8. The fluid circuit of claim 3, wherein the first end portions of the plurality of conduits join the innermost wall inside the first header with a fillet.

9. The fluid circuit of claim 3, wherein the plurality of conduits is a plurality of first pass conduits and a plurality of second pass conduits and wherein the fluid circuit further comprises:

a plurality of third pass conduits extending parallel to the first pass conduits and the second pass conduits between first end portions and second end portions; and a second header integrally formed with and fluidly connecting the plurality of second pass conduits and third pass conduits;

wherein outer walls of the pluralities of second pass conduits and third pass conduits taper outward relative to the longitudinal axes to join the second header.

10. The fluid circuit of claim 9, wherein the second header comprises an outermost wall and an innermost wall;

wherein the second and third pass conduits are joined to each of the outermost wall and the innermost wall of the second header; and wherein outer walls of the second end portions of the second and third pass conduits each comprise a third tapered section, tapering outward to join at least one of the outermost wall and the innermost wall of the second header.

11. The fluid circuit of claim 10, wherein outer walls of the second end portions of the second and third pass conduits taper outward between the outermost wall and the innermost wall to join the innermost wall inside the second header.

12. The fluid circuit of claim 11, wherein outer walls of the second end portions of the second and third conduits join the outermost wall of the second header with a fillet.

13. The fluid circuit of claim 10, wherein the outermost walls of the first and second headers are integrally formed with the innermost walls of the first and second headers, respectively.

14. The fluid circuit of claim 10, wherein each second end portion of the second and third pass conduits comprises an aperture, the aperture disposed between the outermost wall of the second header and the third tapered section.

15. The fluid circuit of claim 10, wherein each second end portion of the second and third pass conduits comprises a plurality of apertures, the plurality of apertures disposed between the outermost wall of the second header and the third tapered section.

16. The fluid circuit of claim 10, wherein the second end portions of the first pass conduits are fluidly connected to one of an inlet and an outlet and wherein the first end portions of the third pass conduits are fluidly connected to the other of the inlet and the outlet.

* * * * *